United States Patent
Meyer et al.

(10) Patent No.: US 12,063,263 B2
(45) Date of Patent: Aug. 13, 2024

(54) SYSTEM AND METHOD FOR DYNAMICALLY MANAGING A MEDIA PRODUCTION WORK PACKAGE FOR A MEDIA PRODUCTION

(71) Applicant: Grass Valley Canada, Montreal (CA)

(72) Inventors: Charles S. Meyer, Crystal Bay, NV (US); James Westland Cain, Newbury (GB); Vincent Trussart, Montreal (CA); Jean-Philippe Lapointe, Montreal (CA); Nicolas Jager, Montreal (CA)

(73) Assignee: GRASS VALLEY CANADA, Montreal (CA)

( * ) Notice: Subject to any disclaimer, the term of this patent is extended or adjusted under 35 U.S.C. 154(b) by 0 days.

(21) Appl. No.: 18/163,823

(22) Filed: Feb. 2, 2023

(65) Prior Publication Data
US 2023/0247080 A1    Aug. 3, 2023

Related U.S. Application Data

(60) Provisional application No. 63/267,464, filed on Feb. 2, 2022.

(51) Int. Cl.
*H04L 65/80* (2022.01)
*H04L 65/75* (2022.01)

(52) U.S. Cl.
CPC ............ *H04L 65/80* (2013.01); *H04L 65/762* (2022.05)

(58) Field of Classification Search
CPC ............................... H04L 65/80; H04L 65/762
See application file for complete search history.

(56) References Cited

U.S. PATENT DOCUMENTS

| 8,417,715 B1 * | 4/2013 | Bruckhaus | G06Q 10/04 705/26.1 |
| 9,043,747 B2 * | 5/2015 | Eksten | G06F 9/44521 717/113 |

(Continued)

OTHER PUBLICATIONS

International Search Report and Written Opinion in PCT/US2023/061876, mailed May 10, 2023, 10 pages.

*Primary Examiner* — Oanh Duong
(74) *Attorney, Agent, or Firm* — ARENTFOX SCHIFF LLP

(57) ABSTRACT

A system is provided for dynamically managing a media production work package. The system includes a media production work package generator that builds a media production work package that includes media processing functions; and a processing function manager that generates function trackers that are each assigned to a respective one of the plurality of media processing functions and comprise a unique identity. Moreover, the system includes a function deployment manager that embeds the function trackers in the respective media processing functions, and deploys the media processing functions to resources available in a cloud computing network that includes both physical resources and software resources. A performance metric collector generates a graphical representation of respective total costs of each the deployed media processing functions and a work package controller generates a data point structure that uniquely identifies the deployed media processing functions and the total costs for each deployed function.

20 Claims, 7 Drawing Sheets

(56) References Cited

U.S. PATENT DOCUMENTS

| | | | |
|---|---|---|---|
| 2005/0228829 A1* | 10/2005 | Richards | G11B 27/36 |
| 2006/0236231 A1* | 10/2006 | Allen | G06F 40/103 |
| | | | 715/244 |
| 2006/0282389 A1 | 12/2006 | Gupte | |
| 2014/0012987 A1* | 1/2014 | Jung | G06F 9/5083 |
| | | | 709/226 |
| 2014/0123129 A1* | 5/2014 | Risbood | G06F 9/5072 |
| | | | 717/176 |
| 2016/0170476 A1* | 6/2016 | Fu | H04L 41/145 |
| | | | 713/310 |
| 2017/0352187 A1* | 12/2017 | Haines | G06V 20/20 |
| 2020/0242532 A1 | 7/2020 | Kawamoto et al. | |
| 2020/0396148 A1* | 12/2020 | Schibler | H04L 41/0823 |
| 2020/0412625 A1* | 12/2020 | Bagarolo | H04L 43/0805 |
| 2021/0011647 A1 | 1/2021 | Coleman et al. | |
| 2021/0314424 A1* | 10/2021 | Kolhar | H04L 43/0876 |
| 2022/0027472 A1 | 1/2022 | Golden et al. | |
| 2022/0225065 A1* | 7/2022 | Doken | H04L 41/5051 |
| 2023/0188807 A1* | 6/2023 | Anthony | G06Q 30/0641 |
| | | | 725/34 |
| 2023/0267924 A1* | 8/2023 | Miller | H04N 21/44222 |
| | | | 725/14 |

* cited by examiner

SYSTEM AND METHOD FOR DYNAMICALLY MANAGING A MEDIA PRODUCTION WORK PACKAGE FOR A MEDIA PRODUCTION

CROSS REFERENCE TO RELATED APPLICATIONS

The current application claims priority to U.S. Patent Provisional Application No. 63/267,464, filed Feb. 2, 2022, the entire contents of which are hereby incorporated by reference.

TECHNICAL FIELD

The system and method disclosed herein is related to media production, and, more particularly, to a system and method for dynamically managing a media production work package for a media production.

BACKGROUND

Live media production typically involves capturing media content from one or a plurality of live scenes (e.g., a sports venue, news broadcast, video game platforms, and the like), transmitting the captured content to a remote production facility where the video and audio signals are managed by production switchers, graphics effects are added, and the like, and then processed signals are encoded for transport to a distribution network, such as a television broadcasting network, through one or a plurality of signals. More recently, broadcasting and media production has evolved from analog to digital domain and across various protocols (e.g., MPEG-2, Internet Protocol (IP), IPTV, Ethernet). In IP technology, there are myriad tools, software code bases, and the like, that present an infinite set of combinations, or development efforts, which lead to a final "product" (e.g., a media production) through execution of media production workflows that incorporate these tools.

With the continuous growth, development and accessibility of cloud computing platforms and networks, such as Amazon Web Service® ("AWS"), many of the processing components involved in a typical media production environment to generate the final product are being moved to "the cloud" and/or being distributed broadly across a number of geographical locations. In the cloud, infrastructure as code (IAC) and configuration as code (CAC) provide for a very dynamic infrastructure that is effectively a software defined processing capability that enables software execution of each desired task at hand. In this case, code modules may be assigned identity, compilers for the code are assigned identity, the IAC and CAC are assigned identity, and the like, to execute these tasks.

However, even with the dynamic software defined processing capabilities that these cloud computing environments present, a problem exists in how to optimize resources of the cloud computing environments to efficiently and economically execute processing functions within a media production workflow. More particularly, the cloud environments are where these modern factories can deployed for workflows, such as media production work packages. Accordingly, there is a need to understand the costs of these media production work packages within these modern factories in order to improve efficiencies and optimize such resources.

SUMMARY OF THE INVENTION

As a general conceptual matter, raw material (e.g., media essence) is feed into a factory, processed, and a final product is produced. That is, essence is the input for a media production factory. In execution of the work package, the essence is processed (e.g., mixed, rendered, and the like) to comply with an editorial intent, and content is produced. Moreover, there is a current need to generate multiple renditions of a certain content output, in order to meet modern revenue goals. By targeting multiple psychographic groups, revenue can be significantly increased. Any Internet of Things accrues value because it enables a control loop which can be driven to optimize something including revenue and usually one or more additional factors. In the case of a media factory, those factors could be latency, as it is critical for human factors, and then perhaps picture quality, which could be a multi-factor metric, as it depends on bit depth, processing speed, and the like. Finally, in a third aspect, the factory may be represented as a graph where nodes typically depict processing points for the work package, and edges are the distribution of intermediate processed essences.

Because these modern media productions have more than one final output and multiple inputs, the media production factory is MIMO (multiple input, multiple output). Conceptually, the mathematical factory is that where there are m essence inputs, $E1(t)$ to $Em(t)$, n Program output, $P1(t)$ to $Pn(t)$ and a factory matrix, dimension m×n, where the internal coefficients are the processes each functions $f(x)$ at various nodes. As described above, there is an creative intent $P'$, such that the error is then $P'n(t)-Pn(t)$ for a given t, and typically over an interval of time, for example, t to t+T. The error is then used to modulate the values of the functions and, in fact, the functions may be time varying by nature, and then additionally time varying due to optimization. The system and method described herein is configured to measure the performance metrics, at a granular level, of the various nodes deployed to execute the work package and, in some instances, direct the error towards zero.

According to an exemplary embodiment, a system is provided for dynamically managing a media production work package for a media production. In an exemplary aspect, the system includes a media production work package generator configured to build a media production work package that includes a plurality of media processing functions; and a processing function manager configured to generate a plurality of function trackers that are each assigned to a respective one of the plurality of media processing functions and comprise a unique identity, with each of the plurality of function trackers configured to dynamically measure a performance metric of the respective media processing function during deployment. Moreover, the system includes a function deployment manager configured to embed the plurality of function trackers in the respective media processing functions, and further configured to deploy the plurality of media processing functions to a plurality of resources available in a cloud computing network that includes both physical resources and software resources, with the plurality of resources comprising a plurality of processors and electronic memory accessible by the plurality of processors. Yet further a performance metric collector is provided to receive the measured performance metrics from the plurality of function trackers during execution of the deployed plurality of media processing functions by the plurality of resources available in the cloud computing network, and further configured to generate a graphical representation of respective total costs of each the deployed plurality of media processing functions based on measure performance metrics associated with the respective unique identifications of each function tracker. The system further includes a work package controller configured to generate a data point structure that uniquely identifies the deployed plurality of media processing functions of the work package and the total costs for each deployed media processing function relative to an entire cost of the media production work package.

In an exemplary aspect, the function deployment manager is configured to dynamically change the deployment of at least one of the plurality of media processing functions in the cloud computing network based on the generated data point structure. Moreover, in another exemplary aspect, the plurality of processors includes at least one computer processing unit (CPU), at least one graphics processing unit (GPU), and at least one field programmable gate array (FPGA).

Moreover, in an exemplary aspect, of the system described herein, the work package controller is further configured to generate the data point structure to represent a media production workflow that includes the work package and that identifies an entire cost of the media production workflow. In an exemplary aspect, the system can also include a function manager optimizer configured to redeploy one of the plurality of media processing functions to a different resource of the plurality of resources in order to reduce the entire cost of the media production workflow.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
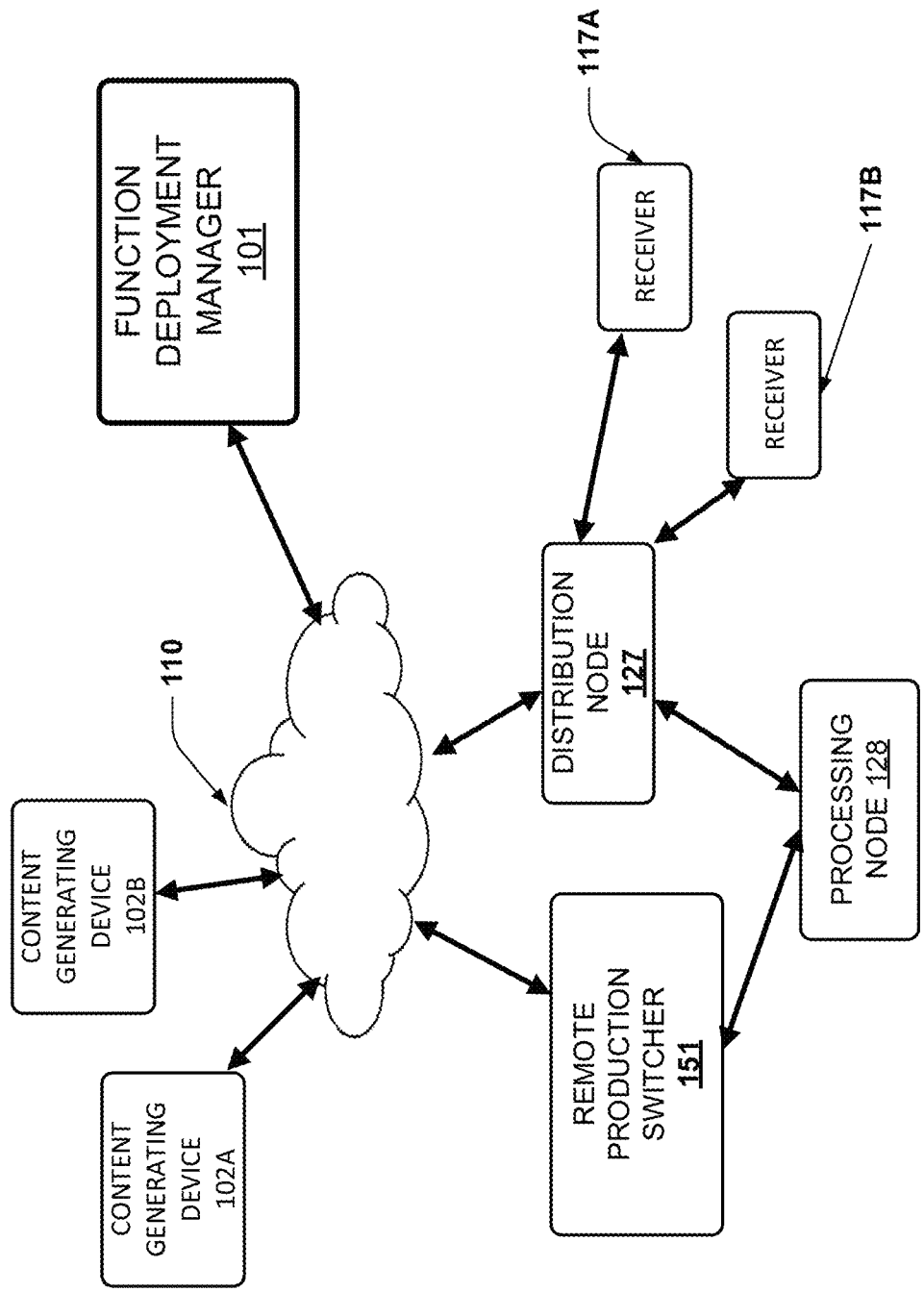
FIG. 1 illustrates a block diagram of a system for dynamically managing a media production work package for a media production according to an exemplary embodiment.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In general, certain aspects of the function deployment optimization system will now be presented with reference to various systems and methods. These systems and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

In general, in order to manage and optimize a media production that is remotely distributed, in a cloud environment, for example, the system and method described herein can measure the performance of each media processing function, such that an error of P'(t) can be driven to zero with a known cost. Moreover, as described in detailed below, each element function can be a deployed process in a CPU, GPU or FPGA, for example. Each element function can also have a latency component due to transport, transit, or file access time, or a combination of all three, for example.

Moreover, each function F(x) that is deployed can be mapped to a technology, which in turn has a cost of usage and latency for performing/executing the deployed function F(x). In general, when a work package is deployed, the IAC/CAC processes of a Cloud provider can parse and then dissect the package into its constituents, which are then deployed within Cloud. In one exemplary aspect, these deployed processes can be configured to be in a container. As deployed, the performance can be measured, for example, of run time speed, memory usage, CPU usage, and the like. Moreover, even transit time of the essence can be measured.

According to the exemplary aspect, each deployed function F(x) is assigned its own immutable identity. However, under existing cloud infrastructure, the IAC/CAC deployment process does not provide an audit trail or pointer structure that identifies which processing function is deployed with which resource and how it is deployed. Thus, according to an exemplary aspect, a pointer structure is generated and managed to measure the performance at a granular (e.g., micro) level of each processing function that is deployed in the cloud infrastructure based on the identity provided by the tags embedded therein. The work package is generated as a logical structure (e.g., one or more nodes representing functions that are connected together in a topology) that is then deployed and implemented as a physical configuration in the cloud infrastructure representing the logical structure, with the immutable identifications providing the mapping between the logical structure/entities (e.g., the tasks or functions of the work package) and the physical implementation/entities (e.g., the nodes in the cloud infrastructure performing the stated functions). Using this mapping, the system and method disclosed herein is configured to audit the identity of each work package, as well as the functions and processes it is composed of, by collecting performance metrics during real-time execution of the functions and processes as they are deployed. In an exemplary aspects, the collected performance metrics can be RAM, CPU, network load, GPU and the like, that are associated with the unique ID of the specific media processing function, without interfering of the actual process running on the particular node of the cloud computing infrastructure.

As described in detail below, a processing function manager, which can be a sub-component or module of a function deployment manager, is configured to insert a marker, flag, and/or identify value (generally referred to as a "function tracker"), with or into (e.g., embed) the media processes and functions, such that even after they have become a deployed media processing function, their respective identity (unique and/or immutable identity) is passed back up through an API to an overall controller application (e.g., a work package controller) that has knowledge of all work packages, their dependent processes and dependent functions, and, therefore, is configured to build a data point structure, i.e., automatically build a full automated state of the deployed work package, that uniquely identifies each of their processes and functions, with their embedded function trackers, and what it costs (based on collected performance metrics), and thereby, what are the total costs for the entire work package.

Thus, in an exemplary aspect, the data point structure can be generated as a viewable graph, topology, histogram, or similar data structure that maps the measured data (i.e., the performance metrics) of each function over time. Moreover, the data point structure provides the physical to logical mapping of the functions with the work package based on the unique IDs for each function tracker. In one aspect, the data point structure can be considered a dynamic work package performance mapping structure that logically represents the physical deployment. By measuring performance metric data over time, the data point structure can be built as a statistical model of resource consumption for an function f(x) component of a work package as it is deployed with a cloud resource and as part of a workflow topology, which represents the graph of the work or tasks to be executed as part of the work package. Thus, the measure performance metrics can determined different known costs between GPU, CPU and/or FPGA, for example, of the cloud computing resource performing the deployed function f(x).

In an exemplary aspect, because the performance standard is learned for each deployed function f(x) within each cloud resource, the system can be configured to flag exceptions, for example, if memory access is taking too long, or the compute is taking too long to satisfy the constraints of the particular work package. Based on these flags, the system can further be configured to determine the if cloud node is failing, or perhaps the node is being over provisioned by the cloud provider for performing the stated function(s). In a related aspect, the data point structure can also be configured to validate improvements in a function f(x) and/or work package. For example, is there a better algorithm to invert the matrix, or apply the transform with the work package then the system can modify the algorithm based on the performance metrics measured over time to optimize the workflow. This validation could be particularly useful in the case of a CODEC where changes in the codec transform parameters could lead to equivalent quality yet for a lower computational cost, for example.

In any event, the data point structure maps the physical implementation of the work package as it is deployed to the logical structure of the work package topology using the unique IDs of the function trackers. The embedded functional trackers in each deployed media processing enable the controller to map the logical representation without losing the mapping once it is physically deployed to the cloud environment. In other words, the functional trackers enable the controller to recover the logical graph based on the immutable identifications. Using the identifications of the functional trackers, the controller can determine which specific cloud node is implementation which of the one or more media processing functions and also develop an understanding of the actual performance metrics by that cloud node to understand how both the media processing function and node itself can be optimized.

By measuring individual costs and calculating a total work package costs, the exemplary method and system can be configured to exploit under-utilized resources, which are available in the cloud infrastructure, and which are otherwise typically abandoned due to the opportunity cost of extracting them. In an exemplary aspect, the function tracker, i.e., the marker, flag, identify value, or the like, can be configured as an environment variable as long as the variable is passed with the deployed function or process. In another exemplary aspect, the function tracker can be implemented as "burned in code" for the specific function or process that is generate by the controller application (e.g., a work package controller) that is inserted into each process and function, prior to deployment to the resources of the cloud infrastructure. In an exemplary aspect, the immutable identify could be loosely modeled as WPID.FID or WPID.PID, where the process function manager can be configured to assign both a unique WP, F or WP, PO as required, even for identical work packages, functions and processes. These parameters can be inserted into the code of the media processing function, such that each respective media processing function is ensured to have unique identity.

According to an exemplary aspect, once each media processing function is deployed to a node in the cloud, the media processing function begins execution (e.g., as part of a work package to generate a media production), and the function tracker is configured to begin measuring the pertinent performance metrics for its function, f(x). In addition, the function tracker can be configured to register its location within the cloud infrastructure (e.g., the particular cloud node) and respective identity with the controller application, and begins to collect and provide the performance metric data. As will be described in detail below, a function deployment manager 101 can be configured as a resource manager that can recover the logical identities of each deployed media processing function based on the embedded logical identifications. As will be described in greater detail below, the function deployment manager 101 can be configured to build a data point structure that represents an overall implantation and use of resources of the deployed work package based on the logical identities.

That is, according to an exemplary aspect, the function tracker can be configured to collect performance metric measurements for programmable time interval, e.g., at a programmable sample rate, such as one sample per millisecond, per second or the like. Moreover, the processing function manager can be configured to adjust these intervals and rates, such that the upstream optimizer (e.g., the work package controller) is not saturated with all the information reported by all the deployed media processing functions. For example, the processing function manager can control the sampling instant and the window of overall time at which the function trackers can measure a specific function as it is deployed within the cloud infrastructure. The performance metric collector can also be configured to coalesce the deployed media processing functions related to a given work package and generate a cloud burst of information, which reflects exactly the total operation costs for a given package. Thus, using the immutable IDs of the function trackers, the processing function manager can map the logical entities for the media processing work package and make optimizing decisions accordingly for the existing and/or future work packages.

FIG. 1 illustrates a block diagram of a system for dynamically managing deployment of a processing function in a media production workflow according to an exemplary embodiment. In an exemplary aspect, the workflow can be the overall operation (e.g., a video or media content production) being coordinated by the system and driven, for example, by a user of the system. Workflows can further be formed by one or more work packages that drive tasks of the workflow. Work packages are in turn composed of one or more atomic functions. As described in detail below, the location of the functions can be tracked by unique IDs during execution and the performance metrics can be fed back to the controller. In turn, the topology of these workflows and/or work packages map the logical to physical layout based on the unique IDs. Moreover, performance metrics can be tracked over time to optimize the atomic functions and their deployment within a work package as well as optimization of the overall workflow(s).

Thus, in an exemplary aspect, system 100 is configured to dynamically manage, measure performance metrics and optimize functions executed as part of a work package in a media production environment and workflow. In general, media content provided for production according to system 100 is referred to as "essence", which denotes media that can be consumed by a user (e.g., a video clip, an audio clip, and/or ancillary data such as captions). As described above, a media production workflow will include one or more work package that each have one or more atomic functions for performing some type of processing on the essence as part of the workflow to generate the media content production. As will be described in detail herein, the function deployment management system 100 enables dynamic and optimal deployment of processing functions to the cloud for performing different types of work on the media essence in a media production workflow. Moreover, the system is configured to dynamically collect and evaluate performance metrics in real-time to measure, and when needed calibrate (e.g., optimize), the execution of the overall work package as it is deployed among a plurality of media processing resources.

According to the exemplary aspect, the performance metrics are collected on a granular level, such as number of video frames being encoded and transferred, as opposed to simply the number of megabytes being transferred. In this example, the process being measured is the recording of the media stream so the controller can determine that the stream has a 1080P media format, for example. As such, the controller can establish how many frames per second are being transferred as opposed to just raw megabytes because the controller has the specific context for the media processing function.

As shown, the system 100 includes a function deployment manager 101, which is the software tool or module (e.g., implemented on one or more computer processing devices) that is configured to deploy media processing function in a cloud computing environment according to the algorithms and techniques described herein. It is also noted that while the exemplary embodiment is described in the context of media production and specifically live or real-time media production or broadcast, the disclosed system and method can be implemented to deploy a processing function as part of a workflow for any number of industries as a technique to optimize a development technology (e.g., a manufacturing factory). That is, the function deployment optimizer 101 can equally be implemented as a factory optimization tool in various software and hardware manufacturing and creation environments.

FIG. 1 illustrate a block diagram that is specific to a live media production environment. As described above, the function deployment manager 101 is configured to deploy a function (e.g., a media processing function) as a component(s) or node(s) of a media production work package(s). Thus, the function deployment manager 101 can generally be located remotely from all of the other components in the system and, in some embodiments, coupled to the components (which are part of a cloud computing environment/network) to effectively deploy and optimize the function. Thus, the components shown in system 100 are provided as an exemplary system.

In general, the media processing function can be considered a required function f(x) for the work package (also referred to as a workflow) that is specialized based on an input data set. In an exemplary aspect, a media production can be represented by two graphs, for example, a first graph representing a topology of an overall workflow and a second graph illustrating the constituent work packages of the workflow being decomposed into the one or more individual atomic functions f(x). Thus, the functions f(x) can be a directed acyclic graph that can be decomposed to one or more atomic compute functions, such that there is no reentry of data to the function (i.e., the function f(x) is stateless). In other words, the function f(x) can be decomposed into one or more atomic compute functions that can be deployed on one or more processing components/nodes of the cloud network. As described in detail below, the function deployment manager 101 is configured to receive performance metrics and, optionally, determine an optimal deployment (e.g., mutate the machine and/or select different machines)

to meet the requirements of the function f(x) while optimizing the memory load for the stated function. In an exemplary aspect, the performance metrics can be collected and analyzed for the full time the function is "deployed" in the cloud resources. That is, upon deployment, the function trackers as described herein are configured to collect performance metrics and transmit them back to the central controller. In turn, this information can be analyzed to optimize the individual functions f(x) as they are deployed and then also the optimization of the work package or set of work packages that form one or more workflows.

Exemplary functions can include multi-viewer generation, with each atomic compute function being, for example, downward image scaling to display a plurality of video feeds (e.g., input and output feeds) as inputs for the single interface of the multi-viewer. Another exemplary processing function for the work package can include, for example, one or more codecs configured to encode and/or decode the video signals at a particular compression format for the transmission to satisfy the media request parameters. In general, such codecs are configured to perform encoding and decoding of video and audio data into data packets for transmission over IP in the media distribution network. In some examples, codecs may encode video and audio data into non-compressed (e.g., linear pulse code modulation, pulse-density modulation, direct stream digital pulse-amplitude modulation, etc.), lossless (e.g., free lossless audio codec, optimFROG, wavepak, true audio, etc.), and lossy (e.g., adaptive differential (or delta) pulse-code modulation, adaptive transform acoustic coding, MPEG-1, MPEG-2, MPEG-3, MPEG-4, etc.). The one or more codecs are provided to compress the media content for transmission through the network. It is reiterated that the deployed media processing functions f(x) can be any type of processing function that is required to execute a media production workflow, for example.

In any event, system 100 further includes a plurality of content generating devices 102A and 102B, which can be configured for an A/V feed across links via the network 110. Moreover, it is noted that while only two devices are shown, the system 100 can be implemented using any number of content generating devices. The plurality of content generating devices 102A and 102B can also include, for example, remote cameras configured to capture live media content, such as the "talent" (e.g., news broadcasters, game commentators, or the like). Moreover, the content generating devices 102A and 102B can include Esports (e.g., electronic sports) real-time content, or the like. In general, it should be appreciated that while the exemplary aspect uses content generating devices 102A and 102B (which may be located at a live event, for example), a similar configuration can be used for a remote video server, for example, that is configured to store media content and distribute this content through the media distribution network.

As further shown, the plurality of content generating devices 102A and 102B can be coupled to a communication network 110, such as the Internet, and/or hardware conducive to internet protocol (IP). That is, system 100 can be comprised of a network of network servers and network devices configured to transmit and receive video and audio signals (e.g., media essence) of various formats. In an exemplary aspect, the communication network 110 and processing components thereof can be executed in part of a cloud computing environment/network. Moreover, in one aspect, essence generated by the content generating devices 102A and 102B can be provided as an input data set for the media processing functions f(x) deployed to the cloud as described herein.

In general, cloud computing environments or cloud platforms are a virtualization and central management of data center resources configured as software-defined pools. Cloud computing provides the ability to apply abstracted compute, storage, and network resources to the work packages provided on a number of hardware nodes that are clustered together forming the cloud. Moreover, the plurality of nodes each have their specialization, e.g., for running client micro-services, storage, and backup. A management software layer for the application platform offered by the cloud will typically be provided on a hardware node and will include a virtual environment manager component that starts the virtual environments for the platform and can include micro-services and containers, for example. As will be described in detail below, the function deployment manager 101 is configured to access metadata for the plurality of cloud computing resources available for the media production workflow and deploy one or more processing functions f(x) for the media production. Moreover, the function deployment manager 101 is configured to obtain performance metrics from each function tracker for each deployed media processing function f(x), and, if desired, optimize the work package, reallocate functions, and the like, based on the collected performance metrics and overall costs of the work package as it is deployed in the cloud environment.

As yet further shown, system 100 can include one or more remote distribution node(s) 127, one or more processing node(s) 128, and one or more remote production switcher(s) 151. As noted above, these components can be implemented as hardware components at various geographical locations or, in the alternative, as processing components as part of the cloud computing environment. The one or more distribution nodes 127 (e.g., electronic devices) are configured to distribute the production media content to one or more distributed nodes (e.g., remote media devices), such as receivers 117A and 117B, which can be content consuming devices (e.g., televisions, computing devices, or the like), for example. Moreover, it should be appreciated that while only two receivers 117A and 117B are shown, the network can include any number of content consuming devices configured to receive and consume (e.g., playout) the media content, with such content consuming devices even being distributed across different countries or even different continents. As a result, the system 100 can be configured as a media network for real-time production and broadcasting of video and audio content. It should also be appreciated that each of the nodes/components shown in system 100 comprise nodes of a media product workflow as would be appreciated to one skilled in the art.

Moreover, in this network, distribution node(s) 127 can further be configured to distribute the media content throughout the distribution network to one or more processing node(s) 128, which may include a mix/effects engine, keyer or the like. Examples of processing node(s) 128 may include remote production switches similar to remote production switcher 151 or remote signal processors and can be included in the cloud computing environment in an exemplary aspect.

Figure 2A:
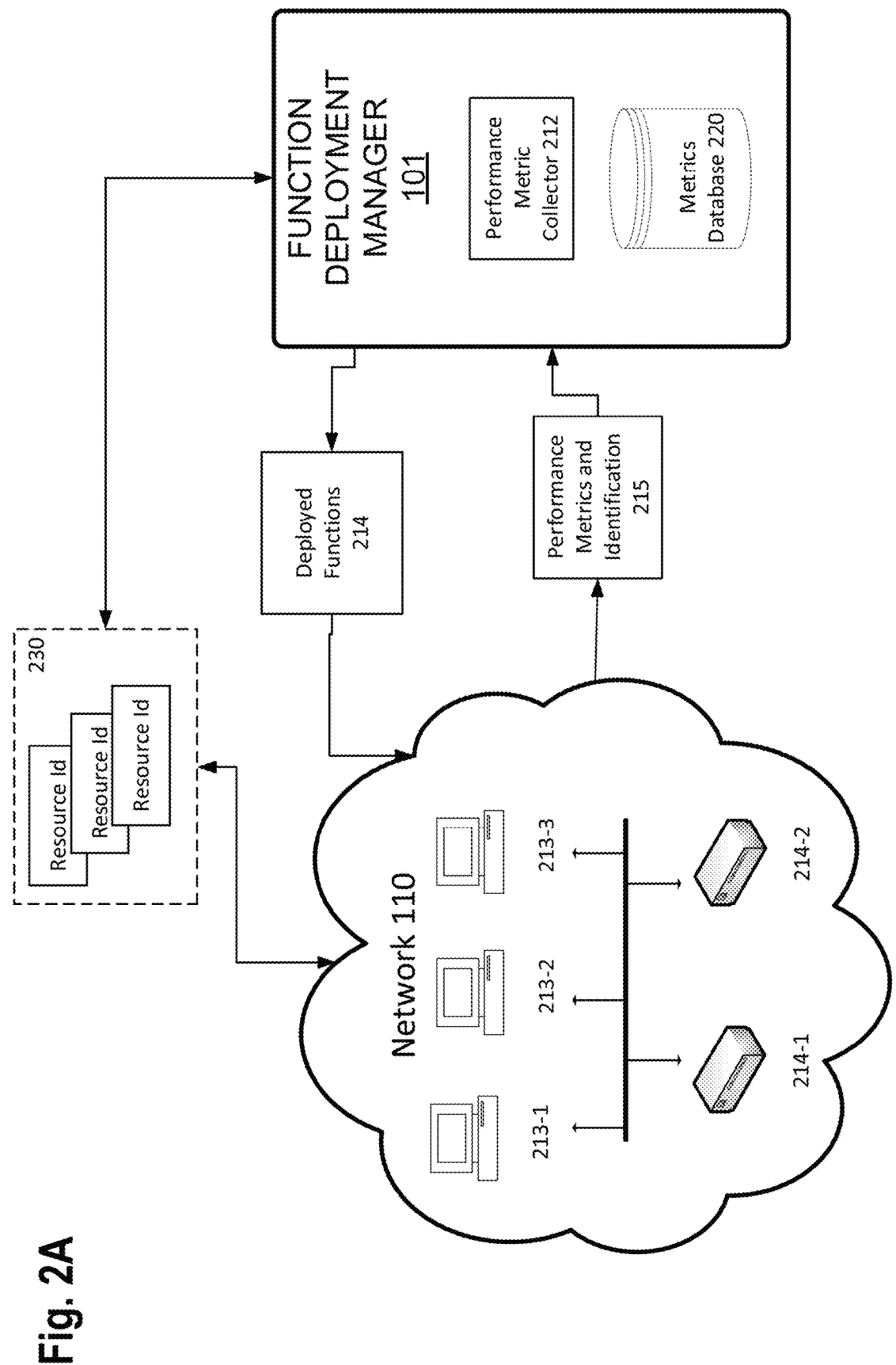
FIGS. 2A and 2B illustrate block diagrams of a system for dynamically managing a media production work package for a media production according to an exemplary embodiment.
Figure 2B:
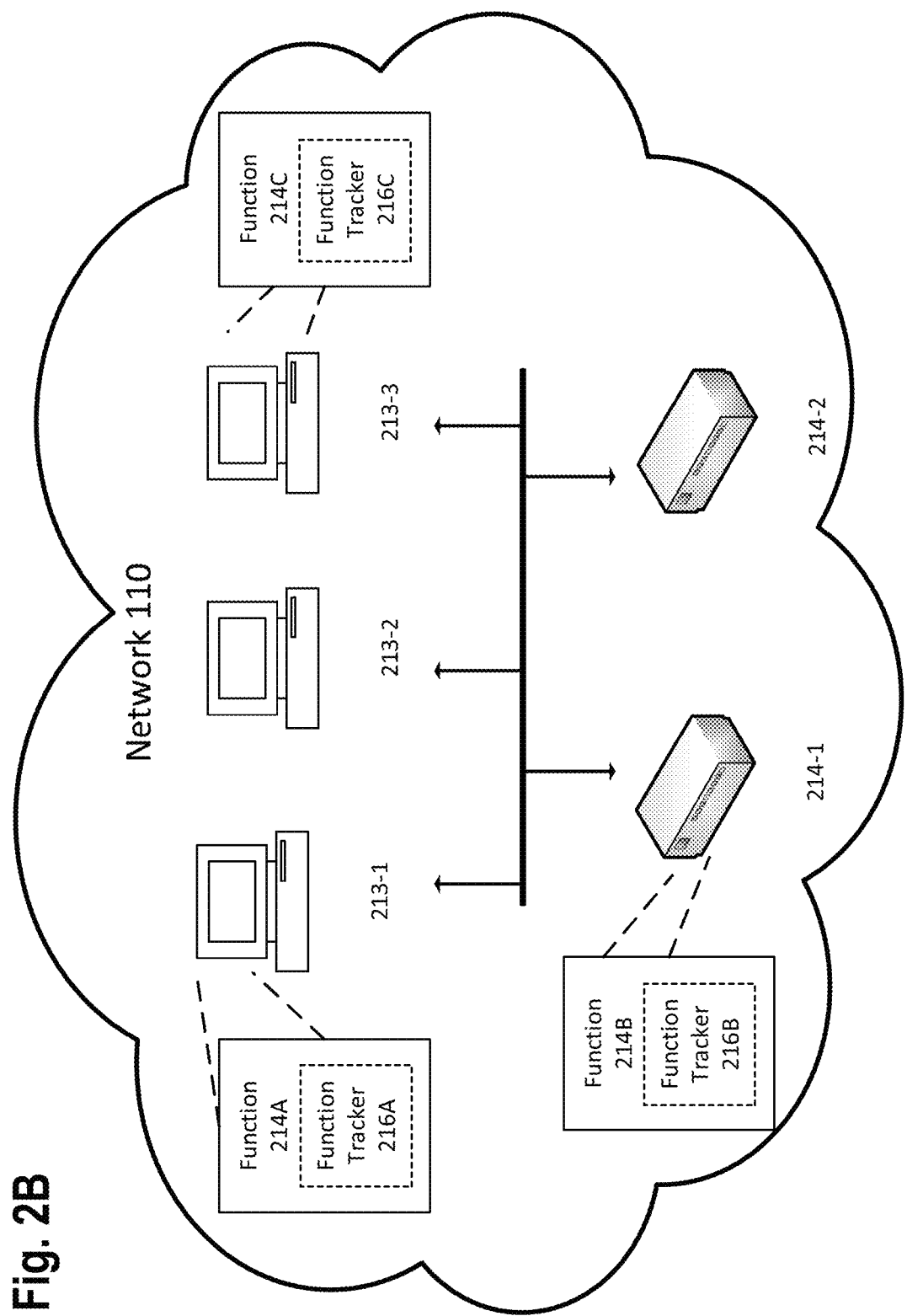

FIGS. 2A and 2B illustrates additional block diagrams of a system for dynamically managing a media production work package for a media production according to an exemplary embodiment. In particular, it should be appreciated that FIG. 2A illustrates a more detailed block diagram system 200A that includes the function deployment manager

101 and cloud computing network 110 of system 100. That is, system 200A illustrates a subset of the components of system 100 in an exemplary aspect. FIG. 2B illustrates a more detailed deployment of cloud computing network 110 with a plurality of nodes having function trackers provided for collecting and upstreaming performance metrics during runtime of the media processing work package.

As described above, the function deployment manager 101 can be implemented on a computer or similar computing device. Moreover, the function manager optimizer 101 can include a performance metric collector 212 and a metrics database 220. The metrics database 220 can be configured as a media processing resource database that receives performance metrics and identification data 215 from the individual nodes of the cloud computing network 110. This identification and metrics data 215 received by performance metric collector 212 and stored in metrics database 220 identifies deployed resources in the cloud computing network 110 that can include, for example, both physical resources and software resources as described above. Thus, the metrics database 220 can include a collection of the measured performance metrics over time of the uniquely identified functions f(x) as they are deployed, the can be stored to generate the data point structure as described herein.

According to the exemplary embodiment, the function deployment manager 101 is configured to generate a plurality of function trackers (e.g., markers, flags, and/or identify values) that can be assigned to and embedded into (e.g., as code) the media processing functions. In turn, these deployed functions 214 can be deployed to a plurality of respective nodes of cloud computing network 110, In an exemplary aspect, the function deployment manager 101 can be configured to query the cloud infrastructure (e.g., by the cloud provider or a database provided by the cloud provided) in order to determine the available resources that are configurable to execute each desired function f(x) of a media processing work package according to defined requirements/criteria to provide the client device with a blueprint for resource allocation and function f(x) deployment for the media production workflow. Resource identifiers 230 can also be provided from the cloud computing network 110 to the function deployment manager 101 so the function deployment manager 101 can generate one or more resource allocation topologies for deploying a media processing work package(s) that includes the required media processing functions f(x) and optimally complete the desired task for satisfying user requirements. In exemplary aspects, the resource identifiers 230 may include metadata descriptors of the type of resource, a make of the resource, capabilities of the resource, usage parameters for the resource, network location and other linked resources. In exemplary aspects, the resource type may be physical (e.g., a computing device, mobile device, microchip, or other internet connected device, or the like), software based (e.g., a software application, a software service, a cloud computing platform, or the like), or the like. The capabilities of the resource enable the function deployment manager 101 to deploy the function f(x) to meet the requirements. Furthermore, the resource may be associated with one or more linked resources, whether of the same or of a different type, that may optionally be invoked by the returned resource.

According to the exemplary embodiment, the function deployment manager 101 includes the performance metric collector module 212 that is configured to collect performance metrics from the plurality of resources in the cloud computing network 110 by the function trackers. It is noted that while performance metric collector module 212 as well as metrics database 220 are shown as components of function deployment manager 101, they can be standalone components or modules associated in alternative aspects. In general, the term "module" as used herein can refer to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

An illustrative set of resources 213-1 to 213-3 and 214-1 to 214-2 is shown in both FIGS. 2A and 2B and represents exemplary available resources in cloud computing network 110. In an aspect, each resource 213-1 to 213-3 and 214-1 to 214-2 can be a device (either tangible or virtual) that has a resource ID 230, that is associated with a respective resources and which has a unique relationship to its respective metadata. The resource IDs 230 can be stored remotely in a cloud computing environment (e.g., as shown by dashed lines of 130) and/or directly stored by the resources 213-1 to 213-3 and 214-1 to 214-2 themselves, for example. In either case, the device IDs 230 are associated with the metadata for each respective resources 213-1 to 213-3 and 214-1 to 214-2.

According to an exemplary aspect, resources 213-1 to 213-3 are a plurality of processing devices configurable for executing processing functions f(x) in a media processing work package and resources 214-1 to 214-2 are accessible memory (e.g., RAM, cache or the like) that can be accessed by the plurality of processing devices to execute the requested function. In a refinement of the exemplary aspect, resource 213-1 is at least one computer processing unit (CPU), resource 213-2 is at least one graphics processing unit (GPU), and resource 213-3 is at least one field programmable gate array (FPGA).

As described in more detail below, the function deployment manager 101 can include a processing function manager that is configured to generate a plurality of function trackers (e.g., software modules) that can include unique IDs and be assigned to individual media processing functions f(x). FIG. 2B illustrates a representation of the cloud computing network 110 in which a plurality of media processing functions with function trackers have been deployed to individual nodes within the cloud computing network 110.

As noted above, the cloud computing network 110 includes set of resources 213-1 to 213-3 and 214-1 to 214-2. As further shown in this example, the function deployment manager 101 has deployed a first media processing function 214A to resource 213-1, a second media processing function 214B to resource 214-1 and a third media processing function 214C to resource 213-3. Moreover, each of the first to third media processing function 214A-214C are associated with or have embedded therein a function tracker 216A-216C, respectively. During execution of the associated media processing functions by each respective node (i.e., each resource 213-1, 214-1, and 213-3), the respective function tracker at each node is configured to upstream performance metrics at a granular level via the respective APIs for each function. This can be performed over a channel directed to the function deployment manager 101 from the specific API. For example, the function tracker of the deployment function can be configured to instruct the operating system of the specific node to provide metrics about how each process is consuming resources. As a result, the workload IDs for the respective cloud can be used to map the metrics onto the logical function that they represent so that the system can determine a "cost" for each function as it runs on a node. Effectively, the collected performance metrics along with the unique identifications associated with each function tracker are transmitted back to the performance metric collector 212 of function deployment manager 101.

In turn, the performance metric collector 212 is configured to dynamically collect or receive this information of the various devices implemented in the cloud nodes and develop the logical mapping of the deployed work package. That is, the function trackers provide the identification of the respective available resources (e.g., resources 213-1 to 214-2) in which each resource is being linked to and shares its unique identity. In one aspect, the unique identity can be an attribute filed in a metadata record. In another exemplary aspect, the unique identity for a resource can be composed of a number of logically grouped identities. The performance metrics are transmitted with the respective identifications.

In another exemplary aspect, a list of resource locators is provided to the function deployment manager 101, which is configured to communicate with the resources to receive performance metrics collected by the function trackers and that are associated with the unique resource ID for that resource. Alternatively, in some aspects, a resource may be smart, connected to the Internet (for example in the cloud environment), and may be configured to submit the collected performance metrics to listening servers. The collected performance metrics and identifications 215 is stored in metrics database 220. Moreover, once a request to find and deploy a function to one or more resources in the cloud computing network 110 is generated, the function deployment manager 101 is configured to retrieve resource IDs 230 to determine available and relevant resources for executing the processing function.

In an exemplary aspect of the present disclosure, the function deployment manager 101 can be configured to establish a unique identify for each of the medial processing functions f(x) whose metrics metadata is collected, the identity establishing the current metrics, capabilities and capacity of the given resource. In one example, the unique identity for IoT or other connected devices can be assigned by a process, similar to DHCP (dynamic host configuration protocol). For example, a physical device could provide its MAC address, or, alternatively, a virtual device could provide a unique address based upon the port MAC and the served IP address. The AMWA IS-05 specification uses LLDP as a way to initiate a connection, and create a unique ID for a virtual resource. It should be appreciated that there is no loss of generality with such method when considering transient devices: one which are spun up, and then later spun down. Accordingly, actual deployment and configuration of the available resource by the function deployment manager 101 can be executed using these known techniques in an exemplary aspect.

Figure 3:
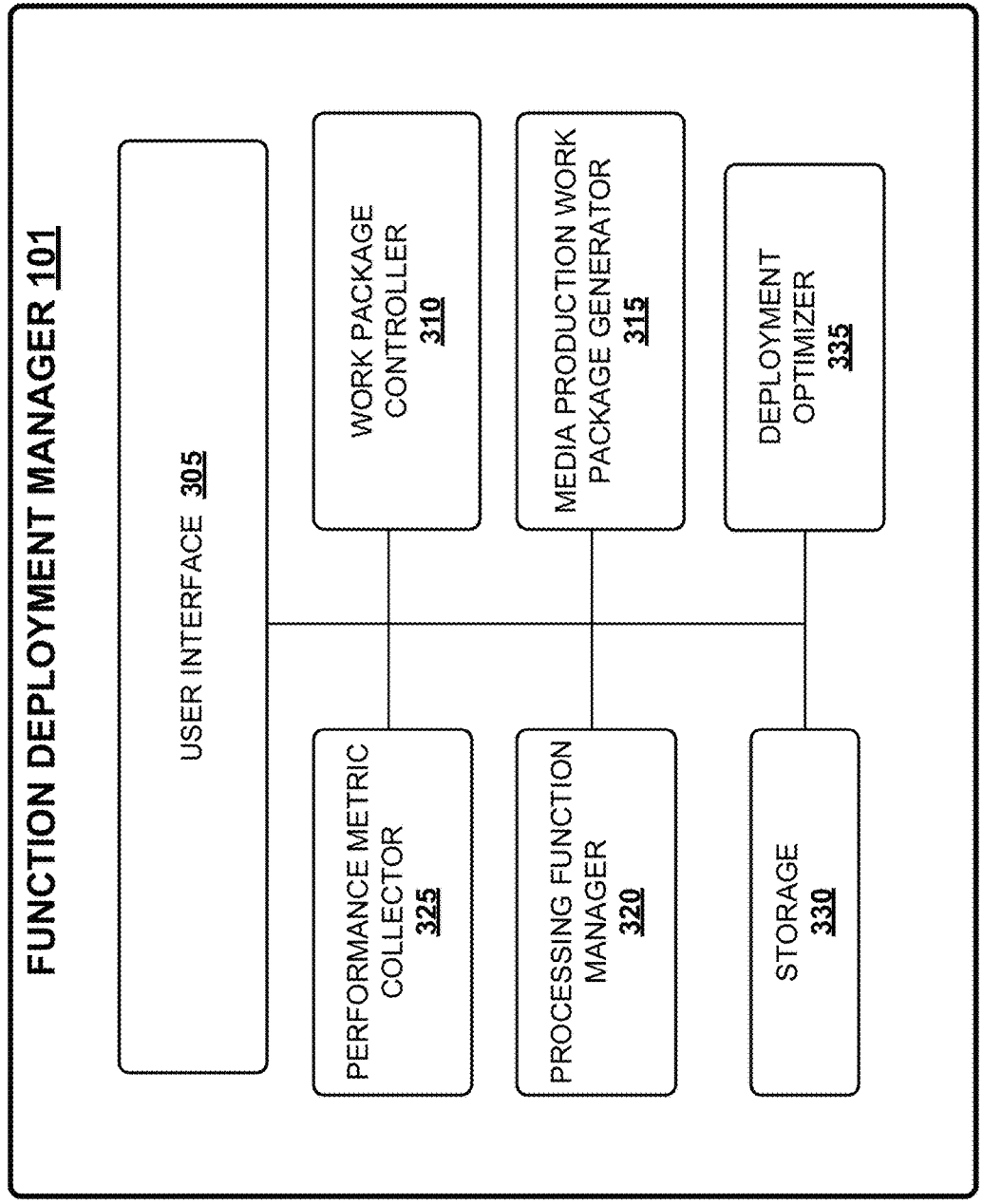
FIG. 3 illustrates a block diagram of a function deployment manager for dynamically managing a media production work package for a media production according to an exemplary embodiment.

FIG. 3 illustrates a block diagram of a function deployment manager 101 for dynamically managing deployment of media processing functions in a media production work package according to an exemplary embodiment. The function deployment manager 101 can be implemented on one or more computing devices that is communicatively coupled to the network 110 for media production as shown above. Moreover, the function deployment manager 101 can include a plurality of components and/or modules for executing the algorithms and techniques described herein.

More specifically, the media production optimizer 101 includes a user interface 305, a work package controller 310, a media production work package generator 315, a processing function manager generator 320, a performance metric collector 325 and storage 330. In general, the storage 330 can be implemented as electronic memory configured to store the one or more work package deployment topologies, function deployment criteria, collected performance metrics and unique identifications and the like. Moreover, each of these components can be implemented as software engines or modules configured for executing the algorithms disclosed herein.

As described above, the system 100 is provided to configure one or more "machines" in a cloud computing environment to each deploy a media process function f(x) in a media production workflow that includes a function tracker for tracking performing metrics during execution of the work package. Thus, according to the exemplary aspect, the work package controller 310 is configured to generate and/or access a user interface 305 on a screen of the computing device, for example, that enables a user to define the media production work package(s) and/or to set criteria and to further select a topology for deploying each function in the cloud computing environment.

In operation, the media production work package generator 315 is configured to build a media production workflow that includes the processing function(s) f(x) executed within the work package to produce the media content. More particularly, a media production work package typically can include a plurality of nodes therein that are each designed and designated to perform a particular task or operation for the workflow (e.g., encoding, multi-view, routing and switching of media signals, and the like). The media production work package generator 315 is configured to define and/or customize a media production workflow, including to design and set one or more functions f(x) to be executed as part of the workflow. In this regard, the media production work package generator 315 is further configured to determine deployment criteria for each of the media processing function f(x) that includes an input dataset for the processing function and at least one atomic compute function for executing the processing function within the generated media production workflow. In other words, the deployment criteria can define the type of input data (e.g., one frame, a plurality of lines of pixel data, or the like) and a required time (e.g., a time threshold) for computing the task.

As described above, a processing function manager 320 can be configured to generate and manage a plurality of function trackers, for example, function trackers 216A-216C as shown in FIG. 2B. In particular, the processing function manager 320 can generate the function tracker, i.e., the marker, flag, identify value, or the like, as an environment variable that is passed with the deployed media processing function. Alternatively, the processing manager 320 can implement each function tracker as "burned in code" for the specific media processing function that is generated by the media production work package generator 315 that is then inserted into each media processing function prior to deployment to the resources of the cloud infrastructure.

Based on the deployment criteria, the media production work package generator 315 is configured to generate, based on the determined deployment criteria, one or, more preferably, a plurality of topologies of the plurality of resources available in the cloud computing network. In other words, the media production work package generator 315 is configured to identify the available resources (e.g., processors 213-1 to 213-3 and memory 214-1 to 214-2) within the network 110 using the resource IDs 230 and metadata, as described above, and to develop possible topologies (e.g., different configurations) of these resources to deploy and execute the requested function of the workflow. In general, the different topologies will offer different outcomes for the user and the workflow, but for executing the same function.

According to an exemplary aspect, the generated plurality of topologies indicate different configurations of these physical and software resources for executing the processing function f(x). It should be appreciated that based on the location of memory 214-1 to 214-2 within the network 110, the configurations will have different abilities and different latency constraints for executing the function f(x). Moreover, each of the processors 213-1 to 213-3 (e.g., GPUs, CPUs, FPGAs, and the like) all have different functional rates of execution based on the memory structure for the function f(x). Therefore, the media production work package generator 315 generates, based on the determined deployment criteria, the plurality of topologies in terms of different compute implementations and how they interact with the available memory, such that the media production manager 101 is configured to determine how each media processing function f(x) will perform and how it should be placed in the cloud computing network 110 to optimize execution and performance while also balancing user constraints, such as time and cost, for example.

As further shown, the function deployment manager 101 includes a performance metric collector 325, which can correspond to performance metric collector 212 of FIG. 2A described above. Similarly, storage 330 can be an implementation of metrics database 220. Thus, during operation, the function deployment manager includes a processing function manager 320 that is configured to embed the plurality of function trackers in the respective media processing functions. The media production work package generator 315 is further configured to deploy the plurality of media processing functions to a plurality of resources available in a cloud computing network that includes both physical resources and software resources. In turn, the performance metric collector 325 is configured to receive the measured performance metrics from the plurality of function trackers during execution of the deployed plurality of media processing functions by the plurality of resources available in the cloud computing network. Moreover, the performance metric collector 325 can be further configured to generate a graphical representation of respective total costs of each the deployed plurality of media processing functions based on measured performance metrics associated with the respective unique identifications of each function tracker in each cloud node. Moreover, the a work package controller 310 can be coupled to the storage 330, which stores the performance metrics, and can be configured to generate a data point structure that uniquely identifies the deployed plurality of media processing functions of the work package and the total costs (in terms of performance) for each deployed media processing function relative to an entire cost of the media production one or more work packages of the workflow.

In an additional aspect, the function deployment manager 101 can be configured to dynamically change the deployment of at least one of the plurality of media processing functions in the cloud computing network based on the generated data point structure. More particularly, the media production manager 101 can further include a deployment optimizer 325 that is configured to dynamically adjust the deployed topology with media processing functions f(x) within the cloud computing network 110 based on the received performance metrics. In an exemplary aspect, the topology is adjusted to include at least one processor (e.g., one or more of processors 113-1 to 113-3) for optimizing accessibility of the electronic memory (e.g., memory 114-1 to 114-2) to execute the atomic compute function of function f(x). Moreover, the memory capabilities and location within the network will impact the carrying out of the function f(x). In an exemplary aspect, the accessibility can be optimized based on at least one of a network type, network bandwidth, network latency, processor type, and processor location within the cloud computing network 110, which can all be determined based on the granular performance metrics collected by the distributed function trackers.

For example, in the cloud, the deployment optimizer 325 may select a CPU, a GPU or an FPGA, or a combination thereof, for a given function f(x) for deployment thereon for the workflow. As noted above, the different topologies may be slightly different for each configuration. For example, different quantization errors may occur based on available arithmetic options in each of the CPU, GPU or FPGA, which can further be monitored from the performance metrics. Another difference could be that compute time could vary significantly, but if the process can wait, the solution might cost less to calculate. In a third difference, the "cloud" might actually reside on premise as a collection of compute nodes, rather than in the cloud. This might be done for reasons of transmission bandwidth, security or both. However, each of these resources may be configured to perform the same function f(x), but with different capabilities (e.g., bandwidth, latency, FLOPs) and/or a different capacity (e.g., 10 Gbps, 5 msec, 1 TeraFlop). These variations in potential deployments enables the deployment optimizer 325 to optimize the deployment of the work package or multiple work packages, while balancing cost and time constraints. In other words, the deployment optimizer 325 is configured to balance the total work package cost (e.g., latency, economic, quality and the like) by executing the function f(x) on different heterogeneous machines in the cloud computing environment. In an exemplary aspect, since each atomic compute function can be "stateless". As such any cascade, or combination of atomic functions receives and propagates information in an acyclic connected way, such that the function f(x) can be presumed predictable and stable, which enables the deployment optimizer 325 to also determine these costs with predictability. As a result, the deployment optimizer 325 can manage the topology for deployment of the work package based on the collected performance metrics and since its input is predictable, the topology configuration of the various work packages can be dynamically adjusted for optimizing costs, latency, power requirements, and the like. As such, any operation (e.g., decimation, discrete cosine transform (DCT), and the like), can be carried out by any of the plurality of resources in the network 110.

In yet a further aspect, the deployment optimizer 325 may be further configured to use the collected performance metrics of each cloud node executing each media processing function to determine the sequence count and timing for transmitting the media essence across the network (e.g., between nodes), as described in U.S. patent application Ser. No. 17/233,256, filed Apr. 16, 2021, and entitled "System and Method for Controlling Distribution of Media Content in a Distributed System", the contents of which are hereby incorporated by reference in their entirety. In this access, the sequence timing is also stably predictable as the media content is "pulled" from a given source node and can be assigned to any set of resources that are available at a given time or for a given cost. In turn, once the performance metrics of the work package are provided to the compute engine (e.g., the deployment optimizer 325), media can be distributed in the pulled manner for the processing function f(x) to operate on. Because each node in the media distribution network is provided its event list, count sequence, and the media, the node is free to carry out the pull process at any rate that satisfies the requirements of the media access request. Knowledge and predictability of these timing sequences enables the deployment optimizer 325 to dynamically change its determination of the optimal topology if this data input because a second type (e.g., if the user updates the workflow).

In a further exemplary aspect, once the deployment optimizer 325 dynamically adjusts the topology for deploying the media processing functions f(x) of the work package based on the collected performance metrics, the deployment optimizer 325 can be further configured to decompose one or more of the media processing function f(x) to one or more atomic functions to be allocated to the specific machines in the cloud computing network 110 as described herein.

In general, it is noted that the function deployment manager 101 (e.g., media production work package generator 315) can be configured to deploy each media processing function f(x) with its associated function tracker, as part of the work package, to the cloud using various techniques as would be appreciated to one skilled in the art. For example, in one aspect, IAC and CAC enables porting (or "lift and shift") that effectively migrates the processing function f(x) to the cloud platform (which includes the media production processing components described above). In turn, the cloud computing platform can receive the request and dynamically modify the configurations for function f(x) in response to the request from the function deployment manager 101 dynamically adjust the configuration. In an alternative aspect, the function f(x) can be configured as one or more containers within the cloud platform, such that the function deployment manager 101 is configured to generate a new container with an update of the workflow application once the optimal topology is determined. This new container can then be provided to the cloud platform 110.

Figure 4:
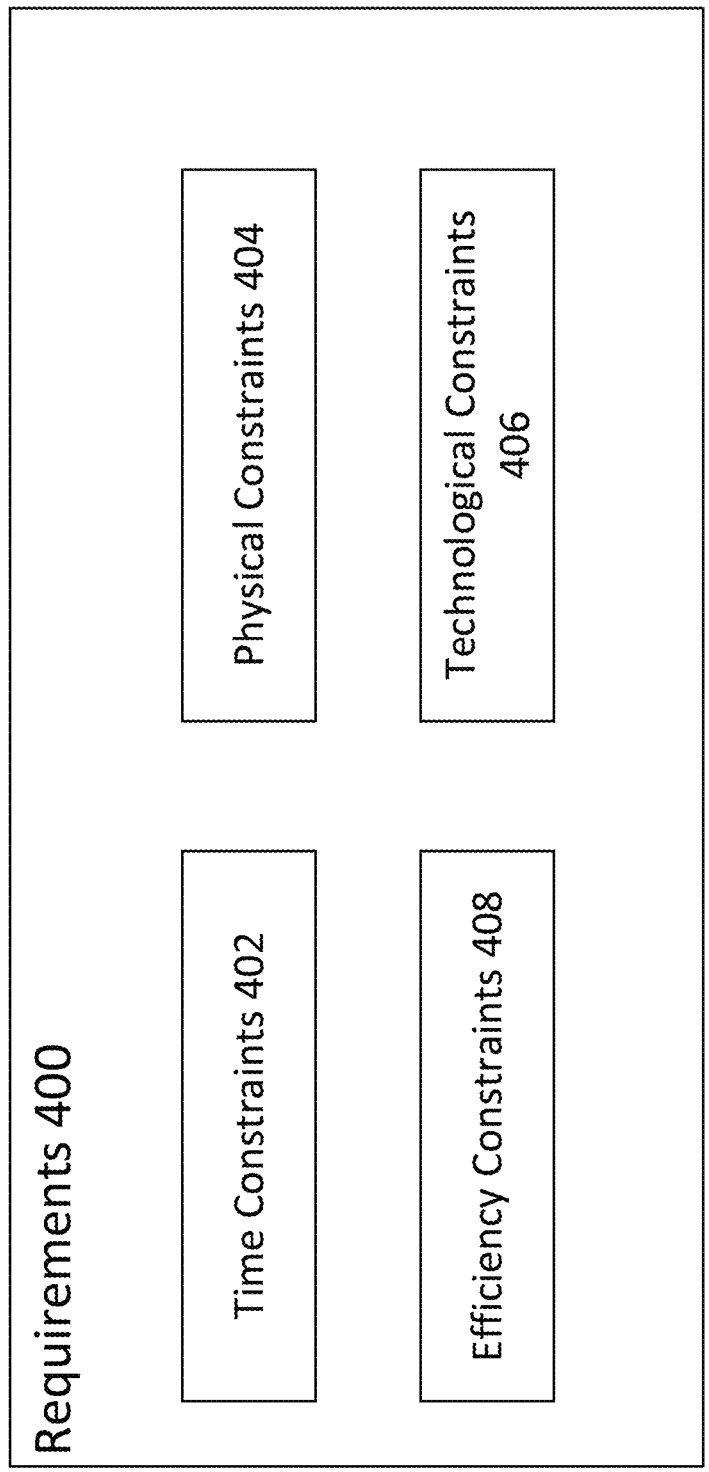
FIG. 4 is a block diagram illustrating exemplary requirements according to an exemplary aspect of the disclosure.

In an exemplary aspect, the function deployment manager 101 can be configured to deploy each media processing function f(x) to satisfy one or more defined requirements/criteria and based on the collected performance metrics. FIG. 4 is a block diagram illustrating exemplary requirements 400 according to an exemplary aspect of the disclosure. The requirements 400 defined or otherwise obtained (e.g., by a user input) by function deployment optimizer 101 can be set for the requested function f(x). More particularly, the requirements 400 can be a set of constraints to execute the function f(x) according to certain defined thresholds for that function within the media processing workflow.

As specifically shown in FIG. 4, the requirements 400 can be defined by time constraints 402, physical constraints 404, technological constraints 406 and/or efficiency constraints 408. For example, if function f(x) must be performed within a certain timeframe (e.g., a time threshold defined by a user via user interface 305), and computing resources are required for completing a portion or all of the task, the time constraints 402 can be defined accordingly (e.g., complete a task within one hour), which will in turn define the possible combinations of computing processor requirements needed to satisfy the defined time constraints 402. Similar determinations can be made for each of the physical constraints 404, technological constraints 406 and/or efficiency constraints 408. For example, if the requested task is editing of live video content, the required bit depth, luminance, color volume, and the like, can be determined based on the defined workflow. The required video characteristics can be specified in the technological constraints 406 of the requirements 400. Other criteria could be, for example, a processor type as discussed earlier, and/or a particular cost associated with the resource.

Using the collected performance metrics during runtime execution of the media processing work package, the function deployment manager 101 can be configured to deploy and adjust the media processing functions f(x) differently for the required processes and allocated memory accordingly. In other words, the system does not simply swap a CPU-based task (e.g., a first topology) to an FPGA-based task (e.g., a second topology), but the system can be configured to dynamically determine multiple topologies (e.g., one FPGA vs. ten CPUs running in parallel) in order to then determine the optimal deployment based on one or more of requirements 400, for example, and also based on the current performance metrics of the actual cloud nodes performing the stated functions. That is, based on the results obtained by the performance metric collector 212 for the allocated devices (e.g., resources 213-1 to 214-2), the function deployment manager 101 can determine an optimal combination (i.e., configuration) of one or more resources for deploying and executing each media processing function f(x) within the work package. For example, at the micro scale, the function deployment manager 101 can effectively remap each decomposed atomic function and, at the macro scale, the system can remap whole subsystems and achieve very different attributes or properties of the process.

Figure 5:
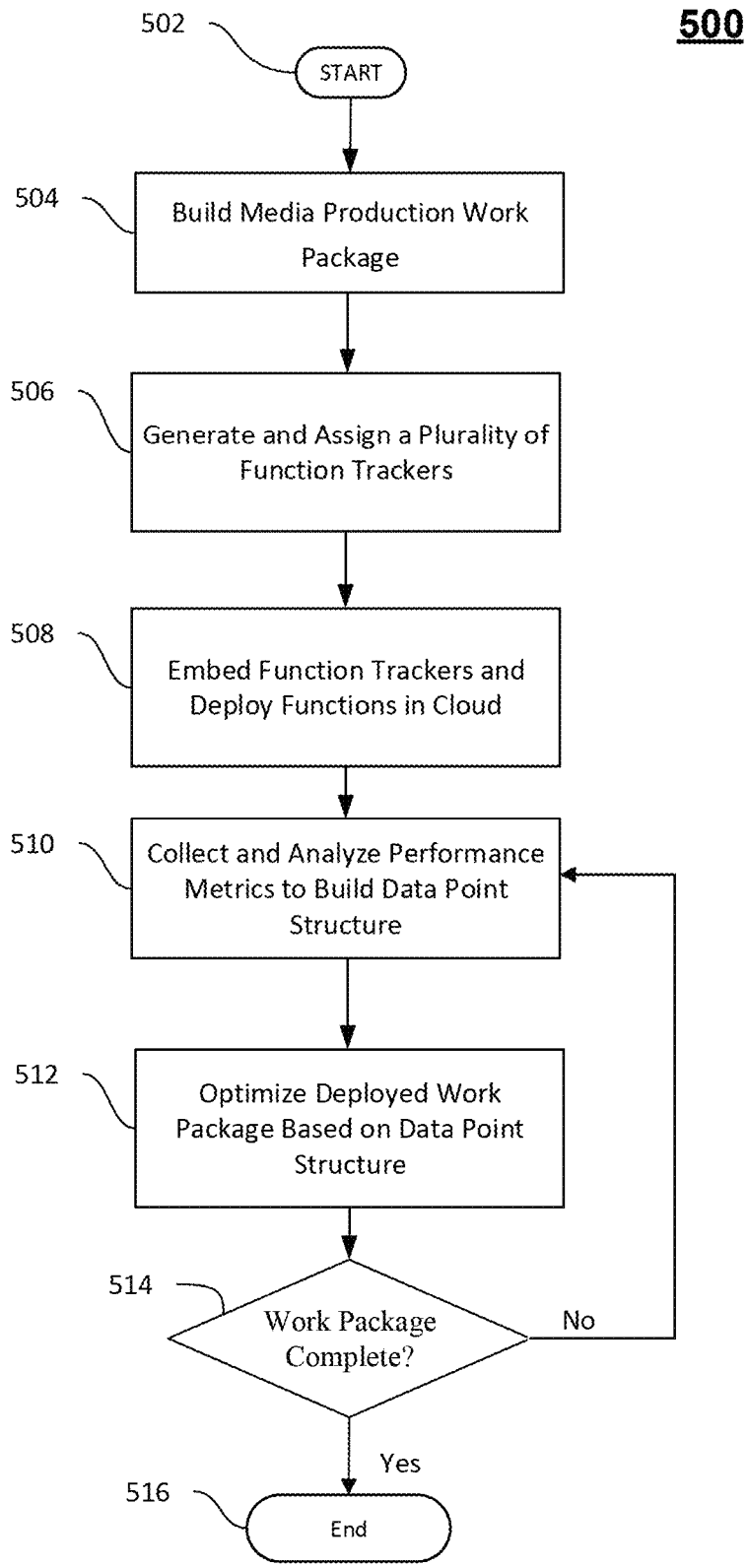
FIG. 5 illustrates a flowchart for a method for dynamically managing a media production work package for a media production according to an exemplary embodiment.

FIG. 5 illustrates a flowchart for a method for managing deployment of a media production workflow according to an exemplary embodiment. In general, it should be appreciated that the method 500 can be executed using one or more of the components described above with respect to FIGS. 1-3. As shown, the method begins at Step 502 when a user, for example, begins building a workflow for media production.

At Step 504, the system is configured to collect or otherwise obtain, from a media processing resource database, metadata associated with a plurality of resources available in a cloud computing network. These resources can include both physical resources and software resources, with the resources comprising a plurality of processors and electronic memory accessible by the plurality of processors, for example. Next, at Step 506, a media production workflow generator builds a media production work package that includes a plurality of media processing functions f(x). Moreover, a plurality of function trackers are generated and/or assigned to each of the plurality of media processing functions f(x), with each function tracker having a unique identification.

It is noted that Steps 504 and 506 can be performed in any sequence and/or in parallel. During Step 506, the media production workflow generator can further be configured to determine deployment criteria for the processing function f(x) that includes an input dataset for the processing function and at least one atomic compute function for executing the processing function f(x) within the generated media production workflow.

At Step 508, the function trackers are embedded or other assigned to the media processing functions f(x). Moreover, a work package topology is selected to deploy the media processing functions with function trackers within the cloud computing network, for example, as shown in FIG. 2B. In one aspect, the topology is selected to include the at least one processor for optimizing accessibility of the electronic memory to execute the atomic compute function, and the accessibility optimized based on at least one of a network type, network bandwidth, network latency, processor type, and processor location within the cloud computing network.

At step 510, the media production work package is executed in the cloud infrastructure, with each media processing function being executed by one or more nodes in the cloud infrastructure. During execution, the function trackers are configured to periodically (or continuously) upstream performance metrics to the function deployment manager 101. In turn, a data point structure can be built that illustrates a total cost of the work package in its current deployment within the cloud infrastructure. Knowledge of the performance metrics at a granular level enables the function deployment manager 101 to make a number of additional deployment actions. In an exemplary aspect, the function deployment manager 101 can also build a histogram that represents the collected performance metrics (e.g., frames transfer per second) that includes an average and standard deviation for each such metric. In exemplary aspects, the histogram can be used to map any performance metrics of the cloud node performing the respective function. In particular, one or more of many different metrics can be recorded including, for example, CPU use, RAM load, Network & Disk IO, GPU use and parameters, and the like. In an exemplary aspect, because as an executable work package, the histogram that provides priority first order estimate of the performance level that the system can achieve and what the system should try to set as a target for the optimizer as a function of deployment. Moreover, during optimization, the system can further refine the expectation for how the work package is deployed or in fact the resources it gets deployed on behave.

For example, at Step 512, once the one or more functions f(x) are deployed according to the selected configuration in the cloud computing network, the media production workflow can be implemented to perform a real-time video production, for example, with an optimized deployment according to the total costs. That is, the video production is executed and includes the deployed functions f(x), which are configured based on criteria defined by a user or system, for example, and can be dynamically adjusted (e.g., reallocated) according to the collected metrics. That is, even though the cloud computing platform/network has a fixed set of resources (e.g., processors 213-1 to 213-3 and memory 214-1 to 214-2), the whole machine (e.g., combination of resources) is elastic based on the variations of possible deployment topologies, which can be modified based on these metrics. As a result, the optimization deployment system can mutate the one or more machines that function f(x) runs on to optimize the accessibility of the memory load.

As an optimization example, at the global computer level, the function deployment manager 101 can measure the amount of compute being used for each specific media processing function. For example, a first function deployed on a note (e.g., processor 213-1) may be taking 2% of the CPU, whereas a second function of the workload is taking 20% for that same note, if the two media processing functions are deployed on the same cloud node. Using this information, the function deployment manager 101 can effectively determine how much of total usage percent of the CPU is utilized by each process. As a result, the function deployment manager 101 can be measuring hundreds of functions and the metrics on a per process basis. All these different metrics on the GPU, the CPU, the network, the RAM, and the like, can be determined so that the function deployment manager 101 can work out how these resources fit together and also how they can be added to or removed and what the impact would be on the total cost of the work package.

At Step 514, the function deployment manage 101 can determine if the work package is complete, for example, if the media production has been generated and can be transmitted to a content consuming device as described above with respect to FIG. 1. If it is not complete, the system can perform a feedback loop to Step 510 and continue to collect performance metrics and dynamically adjust the deployment and distribution of media processing functions accordingly. Finally, once the work package is complete, the method ends at Step 516

Figure 6:
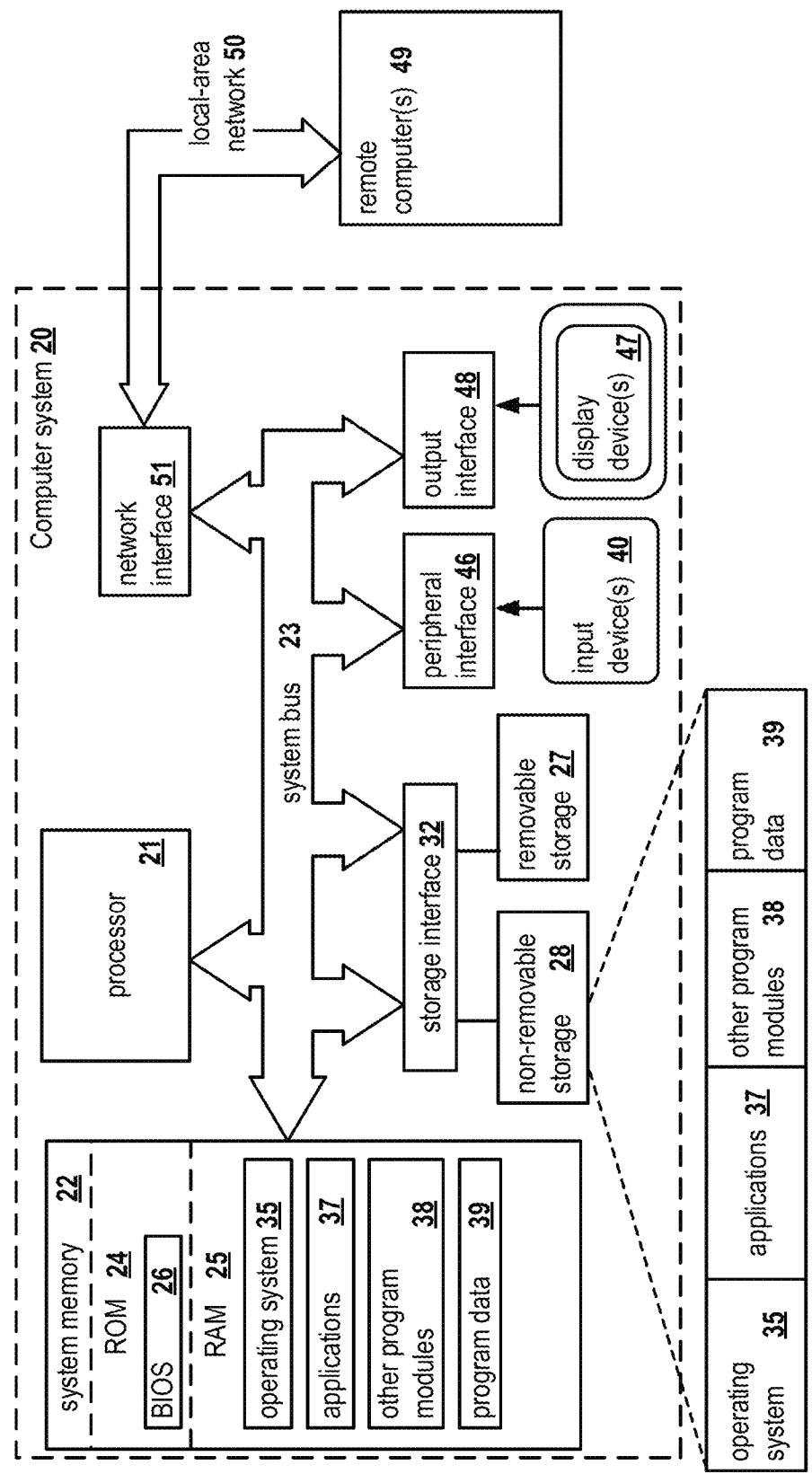
FIG. 6 is a block diagram illustrating a computer system on which aspects of systems and methods for dynamically managing a media production work package for a media production according to an exemplary embodiment.

FIG. 6 is a block diagram illustrating a computer system 20 on which aspects of systems and methods for dynamically managing a media production work package for a media production according to an exemplary embodiment. It should be noted that the computer system 20 can correspond to the system 100 or any components therein, including, for example, function deployment manager 101. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. The one or more remote computers 49 can represent the various cloud resources of network 101 as described above. moreover, other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces. In an exemplary aspect, the one or more remote computers 49 can correspond to the cloud computing network 110 as described above.

In general, exemplar aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for dynamically managing a media production work package for a media production, the system comprising:
    a memory; and
    one or more processors configured to implement instructions on the memory so as to provide:
    a media production work package generator configured to build a media production work package that includes a plurality of media processing functions;
    a processing function manager configured to generate a plurality of function trackers that are each assigned to a respective one of the plurality of media processing functions and comprise a unique identity, with each of the plurality of function trackers configured to dynamically measure at least one performance metric of the respective media processing function during deployment;
    a function deployment manager configured to embed the plurality of function trackers in the respective media processing functions, and further configured to deploy the plurality of media processing functions to a plurality of resources available in a cloud computing network that includes both physical resources and software resources, with the plurality of resources comprising a plurality of processors and electronic memory accessible by the plurality of processors;
    a performance metric collector configured to receive the measured at least one performance metric from the plurality of function trackers during execution of the deployed plurality of media processing functions by the plurality of resources available in the cloud computing network, and further configured to generate a graphical representation of respective total costs of each the deployed plurality of media processing functions based on the measure at least one performance metric associated with the respective unique identifications of each function tracker;
    a work package controller configured to generate a data point structure that uniquely identifies the deployed plurality of media processing functions of the work package and the total costs for each deployed media processing function relative to an entire cost of the media production work package; and
    wherein the function deployment manager is configured to dynamically change the deployment of at least one of the plurality of media processing functions in the cloud computing network based on the generated data point structure;
    wherein the plurality of processors includes at least one computer processing unit (CPU), at least one graphics processing unit (GPU), and at least one field programmable gate array (FPGA).

2. The system according to claim 1, wherein the work package controller is further configured to generate the data point structure to represent a media production workflow that includes the work package and that identifies an entire cost of the media production workflow.

3. The system according to claim 2, further comprising a function manager optimizer configured to redeploy one of the plurality of media processing functions to a different resource of the plurality of resources in order to reduce the entire cost of the media production workflow.

4. The system according to claim 2, wherein the function deployment manager is further configured to query the cloud computing network to determine available resources that are configurable to execute each desired function of a media processing work package according to defined criteria to provide a client device with a blueprint for resource allocation and function deployment for the media production workflow.

5. The system according to claim 1, wherein the plurality of function trackers comprise unique identifications and be assigned to individual media processing functions.

6. The system according claim 1, wherein the function deployment manager is further configured to establish a unique identity for each of the plurality of media processing functions whose metrics metadata is collected, wherein the unique identity establishes current metrics, capabilities, and capacity of a given resource.

7. The system according claim 1, wherein the work package controller is configured to generate or access a user interface on a display screen of a computing device for defining the media production work package or to set criteria and to further select a topology for deploying each function in the cloud computing network.

8. The system according claim 1, wherein the media production work package generator is further configured to define or customize a media production workflow, including to design and set one or more functions to be executed as part of the workflow.

9. The system according claim 8, wherein the media production work package generator is further configured to determine deployment criteria for each of the media processing function that comprises an input dataset for the processing function and at least one atomic compute function for executing the processing function within the media production workflow.

10. The system according claim 9, wherein the deployment criteria defines a type of input data and a required time for computing a task.

11. A method of dynamically managing a media production work package for a media production, the method comprising:
    building a media production work package that includes a plurality of media processing functions;
    generating a plurality of function trackers that are each assigned to a respective one of the plurality of media processing functions and comprise a unique identity, with each of the plurality of function trackers configured to dynamically measure at least one performance metric of the respective media processing function during deployment;
    embedding the plurality of function trackers in the respective media processing functions;

deploying the plurality of media processing functions to a plurality of resources available in a cloud computing network that includes both physical resources and software resources, with the plurality of resources comprising a plurality of processors and electronic memory accessible by the plurality of processors;

receiving the measured at least one performance metric from the plurality of function trackers during execution of the deployed plurality of media processing functions by the plurality of resources available in the cloud computing network;

generating a graphical representation of respective total costs of each the deployed plurality of media processing functions based on the measure at least one performance metric associated with the respective unique identifications of each function tracker;

generating a data point structure that uniquely identifies the deployed plurality of media processing functions of the media production work package and the total costs for each deployed media processing function relative to an entire cost of the media production work package; and dynamically changing the deployment of at least one of the plurality of media processing functions in the cloud computing network based on the generated data point structure, wherein the plurality of processors includes at least one computer processing unit (CPU), at least one graphics processing unit (GPU), and at least one field programmable gate array (FPGA).

12. The method according claim 11, further comprising:
generating the data point structure to represent a media production workflow that includes the work package and that identifies an entire cost of the media production workflow.

13. The method according claim 12, further comprising:
redeploying one of the plurality of media processing functions to a different resource of the plurality of resources in order to reduce the entire cost of the media production workflow.

14. The method according claim 12, further comprising:
once the plurality of media processing functions are deployed according to a selected configuration in the cloud computing network, implementing the media production workflow to perform a real-time video production with an optimized deployment according to costs.

15. The method according claim 11, further comprising:
obtaining, from a media processing resource database, metadata associated with a plurality of resources available in a cloud computing network.

16. The method according claim 15, wherein the building the media production work package and obtaining the metadata associated with the plurality of resources available in the cloud computing network are performed in parallel.

17. The method according claim 11, further comprising:
selecting a work package topology to deploy the plurality of media processing functions with function trackers within the cloud computing network.

18. The method according claim 17, wherein the work package topology is selected to deploy at least one processor for optimizing accessibility of the electronic memory to execute an atomic compute function and the accessibility optimized based on at least one of a network type, network bandwidth, network latency, processor type, or processor location within the cloud computing network.

19. The method according claim 11, further comprising:
executing the media production work package in a cloud infrastructure, with each media processing function being executed by one or more nodes in the cloud infrastructure.

20. The method according claim 19, further comprising:
determining if the media production work package is complete based on if the media production has been generated and can be transmitted to a content consuming device; and based on a determination that the media production work package is not complete, perform the executing the media production work package in the cloud infrastructure.

* * * * *